Patented Jan. 5, 1932

1,839,970

UNITED STATES PATENT OFFICE

WILLIAM A. KONANTZ, OF QUINCY, ILLINOIS, ASSIGNOR TO MOORMAN MFG. CO., OF QUINCY, ILLINOIS, A CORPORATION OF ILLINOIS

VERMIFUGE MEDICINE AND PROCESS OF PRODUCING SAME

No Drawing.   Application filed June 9, 1924.   Serial No. 718,804.

My invention relates in general to drenching compounds for treating animals afflicted with worms, and has to do with the preparation of a vermifuge of increased efficiency and definite composition principally from copper sulphate, nicotin sulphate and arsenic, by a process which will yield a highly concentrated homogeneous and stable solution, easy to handle, ship and administer.

The primary object of the invention is the provision of an acidified solution of ingredients having anthelmintic properties, which will not precipitate on standing, which may be kept indefinitely without deterioration, and which will have remedial properties superior to those of any product for similar purposes now on the market.

I am aware that germicides and worm remedies have heretofore been proposed which contain as an ingredient in more or less indeterminate quantities and strength, such nicotin as can be extracted by the leaching with water of tobacco and snuff. However, aside from deficiencies in other respects, these preparations are not satisfactory for the reason that the crude extracts which are the result of this method of preparation contain nicotin in free state together with large amounts of organic matter which are dissolved in the water along with the nicotin. These solutions, because of the impurities present, undergo fermentative decomposition on standing and are, therefore, utterly unfitted for commercial use. A further objection to them is the fact that when combined with copper sulphate the constituents of the mixture do not remain permanently in solution. I have found that by substituting for the crude tobacco extracts just described a nicotin sulphate solution such as can be prepared either by gasoline or steam distillation of the tobacco and subsequent recovery of the nicotin, as nicotin sulphate, I am able, with the other prescribed ingredients, to produce a product having none of the undesirable characteristics of the crude tobacco extracts when used for this purpose.

Other medicines for the same general purpose have been found lacking in their curative properties due, no doubt, to the failure to combine what I consider to be essential ingredients in the proper manner.

In preparing a compound in accordance with the invention, we may proceed, for example, as follows:

Thirty pounds of copper sulphate crystals are dissolved in eight gallons of water, to which is added five pounds of 37% hydrochloric acid. The purpose of acid is to maintain the ingredients to be added in solution. Dissolve one pound of caustic soda in one quart of water and then add two pounds of 99% white arsenic to make a solution of sodium arsenite. The sodium arsenite solution is slowly added to the copper sulphate solution with constant stirring to insure a stable, homogeneous mixture. Five pounds of 40% nicotine sulphate are now added and if desired, one ounce of amaranth to give a desirable color. Water to make a total volume of twenty gallons is added and the liquid filtered, after which it may be placed in containers for shipping. In this form the solution is highly concentrated and before using, it is to be diluted with fifteen parts of water. Of course it can be prepared for immediate use by adding the required diluting water while mixing.

While the foregoing example specifies what I consider to be a preferred method of procedure, various modifications as to the form of the ingredients, the amounts and proportions used are permissible, and are contemplated as within the scope of the invention as defined by the appended claims.

A vermifuge prepared in the manner recommended will be found to be entirely effective for stomach worms in sheep, and to have high efficiency in the removal of tape worms, whip worms and the nodular worms found in sheep, as well as having high therapeutic value in the treatment of those diseases peculiar to sheep which have been diagnosed as hemorrhagic septicemia and also in the cure of other germ diseases.

I claim:

1. A vermifuge which contains the product of a mixture of copper sulphate, sodium arsenite, nicotin sulphate and hydrochloric acid in the approximate ratio of thirty parts by weight to three to five to five calculated on a dry basis.

2. The method of producing a vermifuge which comprises preparing an acidified solution of copper sulphate, adding thereto an arsenic salt solution and then nicotin sulphate and stirring constantly to avoid precipitation.

3. A vermifuge comprising the reaction products of copper sulphate, sodium arsenite, and nicotin sulphate free from other constitutents of tobacco and hydrochloric acid.

4. A vermifuge, comprising the product of a solution of copper sulphate, sodium arsenite, nicotin sulphate, and hydrochloric acid in a quantity sufficient to maintain said product in stable solution.

In testimony whereof I have hereunto signed my name.

WILLIAM A. KONANTZ.